United States Patent [19]

McGrady

[11] Patent Number: 4,799,476
[45] Date of Patent: Jan. 24, 1989

[54] UNIVERSAL LIFE SUPPORT SYSTEM

[75] Inventor: Michael B. McGrady, Federal Way, Wash.

[73] Assignee: The Boeing Company, Seattle, Wash.

[21] Appl. No.: 913,703

[22] Filed: Sep. 29, 1986

[51] Int. Cl.$^4$ ................................................. A61B 9/00
[52] U.S. Cl. .................................. 128/202.11; 600/20
[58] Field of Search ............. 128/1 A, 202.11, 202.19; 2/2.1 A

[56] References Cited

U.S. PATENT DOCUMENTS

| | | | |
|---|---|---|---|
| 2,494,005 | 1/1950 | Sabbia | 128/1 A X |
| 2,494,207 | 1/1950 | Sabbia | 128/1 A X |
| 2,824,557 | 2/1958 | Mejean et al. | 128/202.11 X |
| 3,034,131 | 5/1962 | Lent | 128/1 A |
| 3,106,203 | 10/1963 | Mayo et al. | 128/1 A |
| 3,463,150 | 8/1969 | Penfold | 128/202.11 |
| 3,487,765 | 1/1970 | Lang | 98/1 |
| 3,635,216 | 1/1972 | Curtis | 128/142.5 |
| 3,915,154 | 10/1975 | Cosentino | 128/1 A |
| 4,095,593 | 6/1978 | Webbon et al. | 128/202.11 |
| 4,230,097 | 10/1980 | Beaussant et al. | 128/1 A |
| 4,243,024 | 1/1981 | Crosby et al. | 128/1 A |

Primary Examiner—Edward M. Coven
Attorney, Agent, or Firm—Seed and Berry

[57] ABSTRACT

A universal life support system adapted for use in an aircraft or spacecraft. The system includes components attached to the aircraft or spacecraft, components attached to the seat, and the ensemble to be worn. While appropriate gases and signals are sent between the craft and the seat, the seat connector at the suit side is adapted to receive any of the variety of connectors used with the ensembles that may be worn. While all potentially required gases, electrical signals, and electrical power are provided at the seat side of the seat-ensemble connection, the ensemble connector is configured to receive possibly only a subset of them. In addition, the ensemble connector can actuate a switch built into the seat connector to produce a signal indicative of the suit being worn. This signal provides information to the life support control system in the aircraft to cause the life support control system to adapt appropriate temperature and gas supply schedules.

11 Claims, 5 Drawing Sheets

4,799,476

UNIVERSAL LIFE SUPPORT SYSTEM

TECHNICAL FIELD

The present invention relates to a life support system for use in an aircraft, and more particularly, to a universal life support system capable of tailoring its performance to the specific life support ensemble being used.

BACKGROUND ART

The use of mission-specific ensembles by occupants of aircraft and spacecraft has been well established. Depending upon the mission for which the ensembles are intended, they can take any of a wide variety of forms. While, for low-altitude missions (between, for example, altitudes of 10 thousand and 50 thousand feet), special breathing masks may be required, for high- altitude aircraft missions and space missions, pressurized suits are required. Below 10 thousand feet, no mask may be required at all, unless a chemically or radiationally contaminated atmosphere is expected.

There are three types of pressurized ensembles: full pressure suits, and partial pressure suits, and hybrid suits. Full pressure suits, which enclose the wearer's entire body, allow the pilot to remain at his chosen altitude, even following cockpit decompression. Partial pressure suits, which do not cover the wearer's extremities and have a separate non-pressurized helmet and visor and a breathing mask, give counter-pressure to the wearer's torso to aid the wearer's breathing. Partial pressure suits require the pilot to descend below 25,000 feet following any cockpit decompression in order to avoid physiological damage due to altitude sickness. Hybrid suits feature a full pressure helmet used with a torso-covering pressurized garmet.

Present full pressure suits operate at a pressure of 3.5 pounds per square inch differential (psid). There are several disadvantages associated with the use of such suits. For example, prior to takeoff, it is required that the wearer pre-breathe pure oxygen for sixty to ninety minutes. In addition, donning full pressure suits is slow and requires assistance, particularly because a full pressure suit weighs approximately 40 pounds.

On the other hand, some partial pressure suits are lightweight, can be donned rapidly without assistance, and are designed for use in environments in which full pressure suits are incompatible, especially those where quick response is required.

Both full and partial pressure suits can include, or be used with, equipment required for special purposes. Examples are anti-gravity garments needed in high acceleration environments and specialized filters needed in chemically or radiation-contaminated environments. Hybrid suits, incorporating some elements of full pressure and of partial pressure suits, are also possible.

In some situations, there may not be a need for an occupant to use a full ensemble. Examples of such situations are to use the craft to practice takeoffs and landings or to ferry the craft to another location, where a pilot need not wear anything more than a standard flight suit. Wearing an ensemble that exceeds the performance requirements of the mission at hand can be unnecessarily burdensome and may possibly lead to pilot fatigue and consequent errors.

At present, virtually all air- or spacecraft are mission-specific. The use of a pariticular craft for a wider variety of missions, some requiring full pressure suits for high altitudes, others requiring other partial pressure suits, requires that the craft be reconfigured with each new mission to support the newly-required ensemble. Reconfiguration is very expensive and time-consuming, so that it can be impossible in case a quick response is needed.

The control of the environment of such a suit can be sophisticated, employing anti-g valves, thermal, and communications systems. In addition, different missions can require breathing gas mixtures. Each suit type demands different controls and different breathing gas and temperature schedules.

It is desirable, therefore, to have a universal life support system able to function with a variety of mission-specific suits without requiring reconfiguration of the cockpit of the craft.

DISCLOSURE OF THE INVENTION

It is an object of the present invention to provide a life support system allowing an aircraft or spacecraft to be used in a wider variety of missions than are presently conveniently possible.

It is another object of the present invention to provide a life support system allowing a aircraft or spacecraft to be used in a variety of missions on a quick-response bases.

It is a further object of the present invention to provide a universal life support system capable of automatically switching its controls from one kind of suit to another.

It is yet another object of the present invention to provide a life support system capable of supporting hybrid suits.

In general, the universal life support system of the present invention is to be used by an occupant of a craft who can wear one of a plurality of distinct ensembles, the ensemble being dependent upon the mission the craft is to perform. The system comprises a source of a breathable gas, the source being responsive to a control signal, a source of at least one signal containing information regarding the mission to be perfomred by the craft, and a first connector having actuable switch means capable of producing a distinct signal representative of the mission the craft is to perform. The first connector is opearative to receive and transmit the breathable gas and the mission signal. The first connector is further adapted to mate with each connector in a plurality of distinct second connectors, at least one second connector being adapted to activate the switch means to produce the mission signal. Each of the distinct second connectors is attached to one of the plurality of distinct ensembles.

In a first embodiment, the life support system of the present invention can comprise a life support system controller, a thermal control unit, an anti-g valve, a communications system, and electrical power. The apparatus can further comprise an emergency source of oxygen connected to an electronic breathing regulator. The second connectors are separately attached to a full pressure suit and a partial pressure suit. The second connector for the full pressure suit is adapted to activate the switch to produce a control signal that is sent to the controller to cause the controller to switch to full pressure suit schedules for the thermal control unit and the breathing regulator, and to turn off the anti-g valve.

BEST MODE FOR CARRYING OUT THE INVENTION

The variety of ensembles that can be useful with any particular craft can be quite large. They can range from full pressure suits to normal flight suits. They may also include special rapid response garments, nuclear-biological-chemical protective ensembles, and high performance ensembles, including high-g garments. Further, they may include special accessories such as goggles to prevents blindness in case of a nuclear flash. This range of garments has conflicting requirements, and a universal life support system must be capable of sorting out these requirements based on the suit presently in use.

Figure 1:
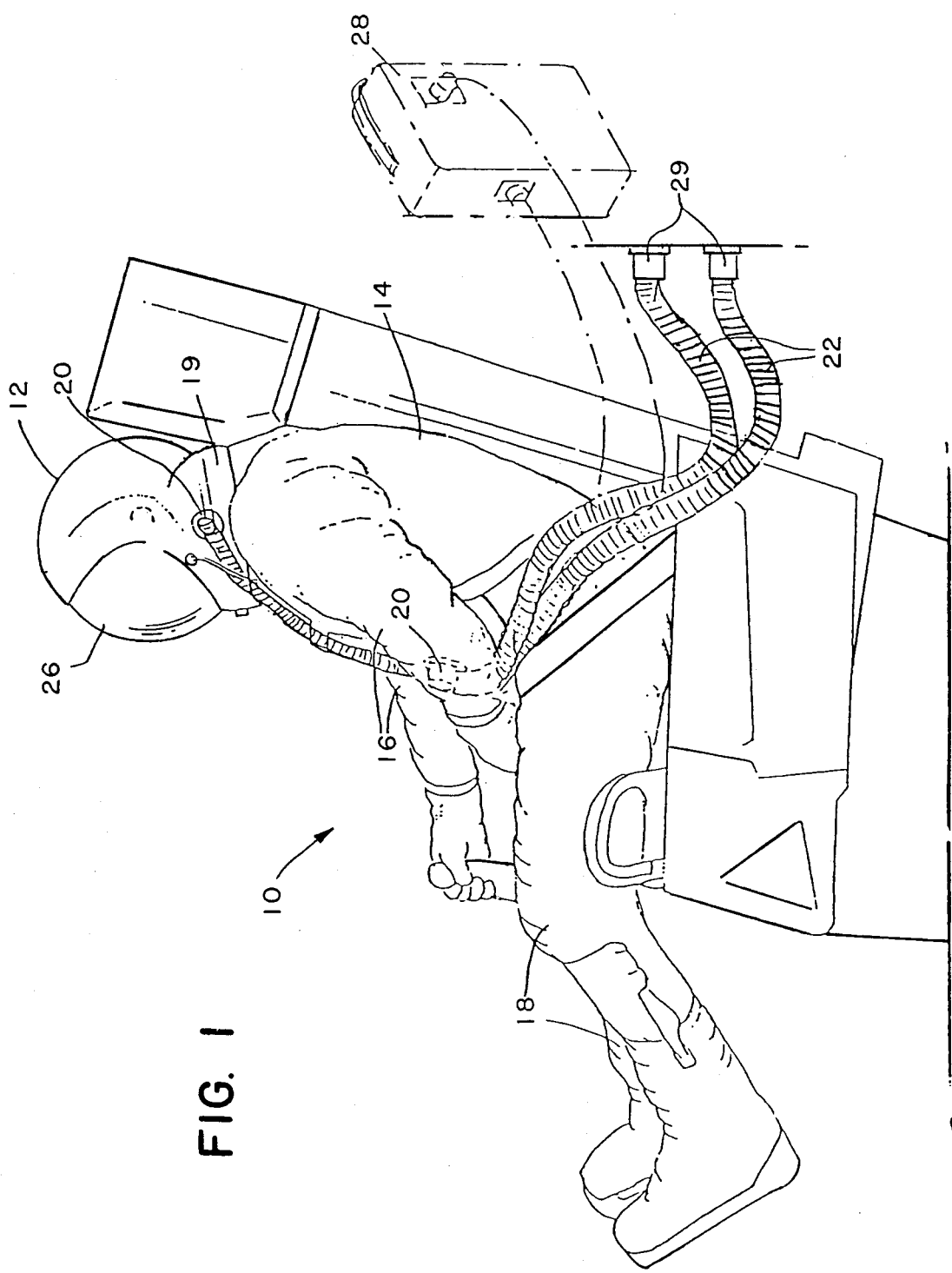
FIG. 1 is a diagram of a full pressure suit of the type worn on missions at altitudes exceeding 50 thousand feet.

FIG. 1 shows a typical full pressure suit developed for use on missions in craft which exceed 50,000 feet. The suit 10 fully contains the body of the pilot and includes a helmet 12 and a body portion 14. The body portion has arms 16 and legs 18, allowing the wearer limited maneuverability. The helmet connects to the rest of the suit by means of a pressure-tight neck ring 19 which is adapted to receive the helmet and complete a pressure-tight enclosure for the pilot.

Suit 10 is adapted with connectors 20, which connect to hoses 22, to supply the suit with a breathing gas at a regulated pressure. This pressurized breathing gas is passed from the suit to the ambient atmosphere through a differential pressure valve (not shown) on the suit. The breathing gas is also used as a ventilating gas to keep visor 26 clear and the crew member comfortable.

As will be obvious to those skilled in the art, when a person wearing suit 10 reaches the craft to be used on the mission, hoses 22 are removed from the portable unit 28 and connected to mating connectors 29 within the craft.

Figure 2:
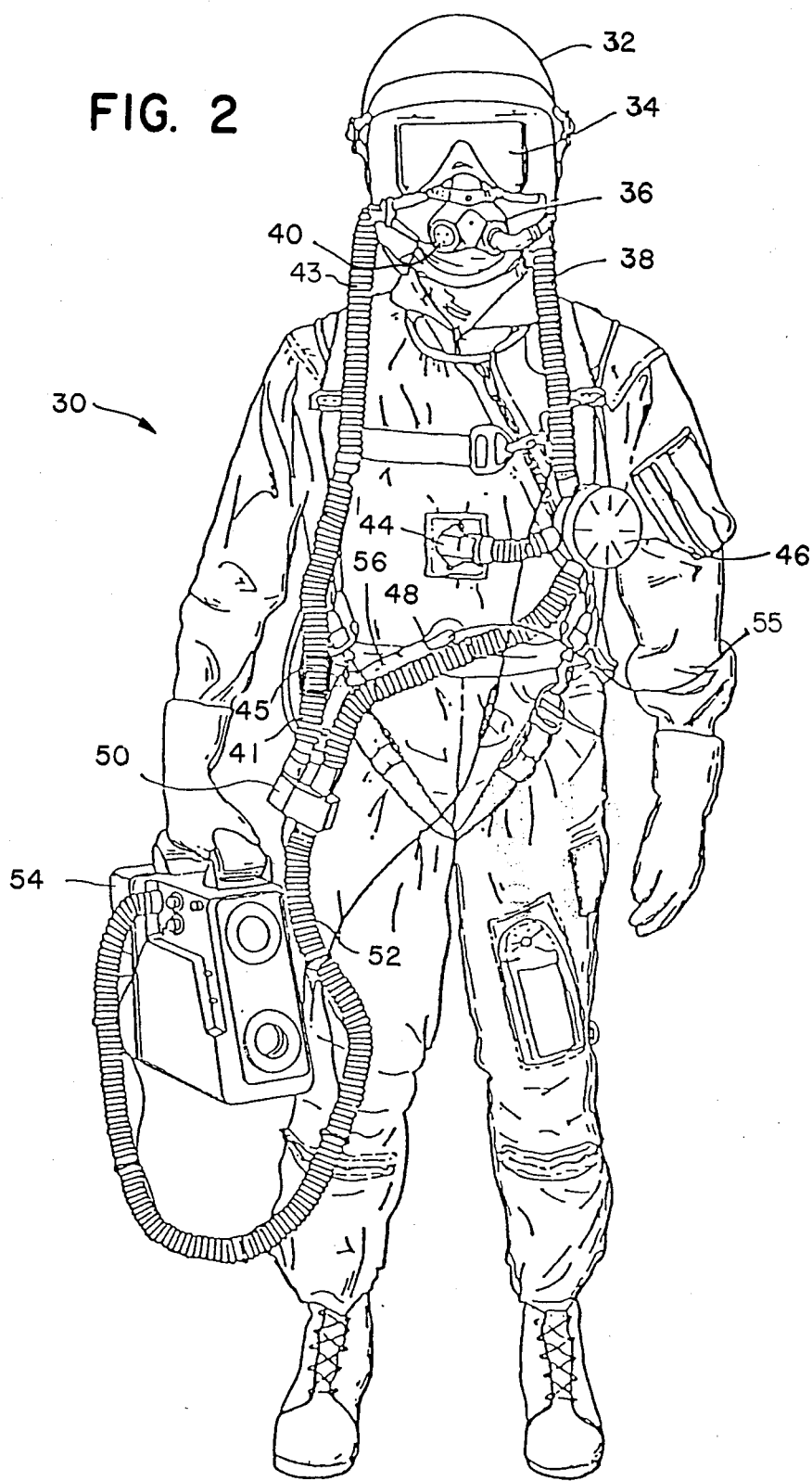
FIG. 2 is a diagram of a partial pressure suit adapted for use with the present invention showing its use with a portable power unit.

FIG. 2 shows a partial pressure suit 30 comprising a helmet 32 with a visor 34 and a breathing mask 36. Mask 36 can be supplied with a suitable breathable gas, typically oxygen-enriched air (although the gas could be pure oxygen), through tube 38. The mask is ventilated externally through valve 40. Air in the helmet leaks out around the neck, thereby preventing the entry of any contaminants. In the event of a chemically contaminated environment, the helmet can be supplied with filtered air through hose 41. The upper body of the person wearing the suit can be enclosed in a jerkin garmet equipped with inflatable bladders to balance the external pressure on the wearer's body with the pressure of the breathing gas. This is done to aid the wearer in breathing. The jerkin garmet partial pressure suit receives the breathing gas through tube 42, which connects to the suit and the jerkin garment bladder at connector 44. Both tubes 38 and 42 attach to filter assembly 46, which, in turn, is supplied gas through hose 48. Supply hose 48 and filtered air hose 41 both connect to personal equipment connector (PEC) 50. Hose 52 is detachably connected to the PEC and runs to the portable unit 54.

After the person wearing suit 30 is properly seated in the craft, the PEC is disconnected from hose 52 and then connected to a mating connector (described more fully subsequently) built into the craft. The partial pressure suit also contains a lower g garment which is attached between connector 50 and fitting 55 by hose 56 and inflates to a predetermined pressure to provide high altitude or high g protection.

Figure 3:
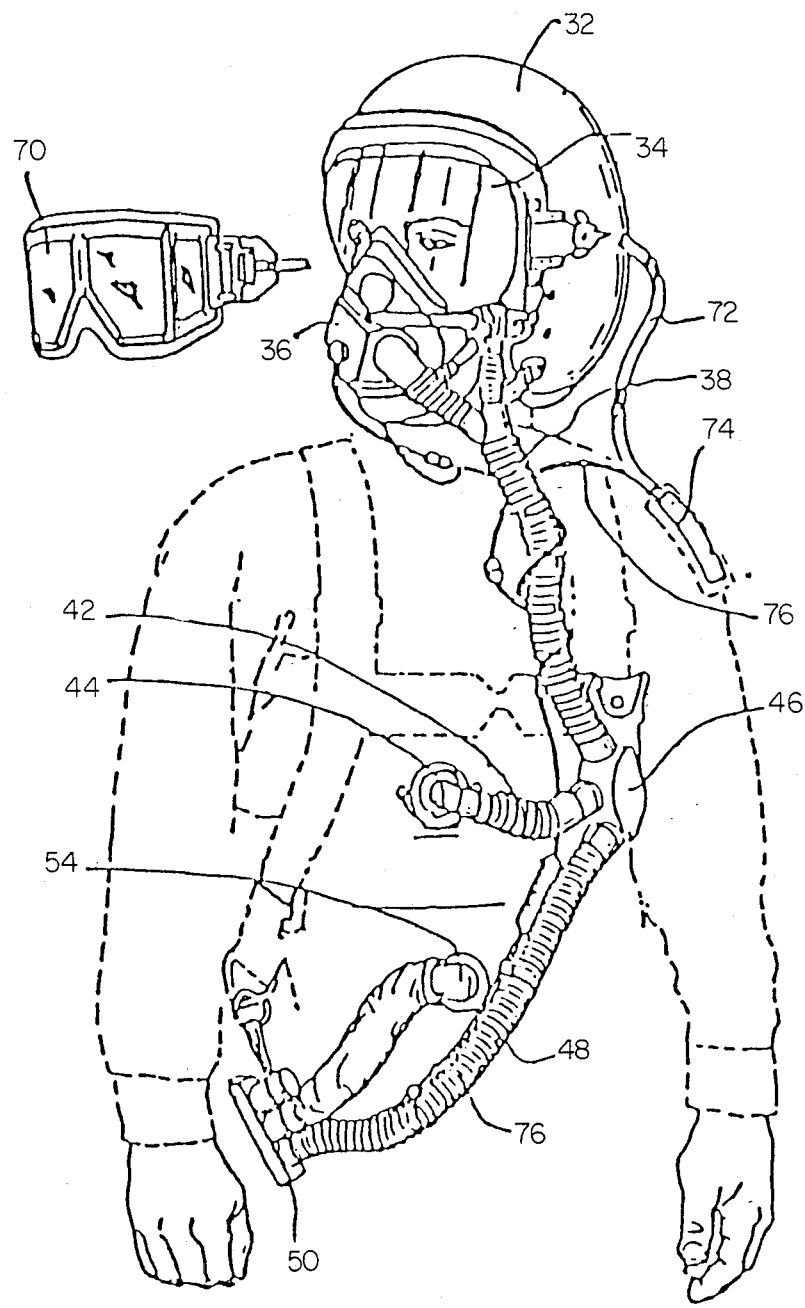
FIG. 3 is a diagram of a second partial pressure suit incorporating anti-blindness goggles and adapted for use with the present invention.

FIG. 3 shows a variation of the partial pressure suit of FIG. 2. In this variation, the visor can be covered by a goggle 70 that connects to cable 72. Cable 72 runs to a goggle controller assembly 74, which, in turn, is supplied with electrical power over wire 76. Wire 76 runs to the PEC. A goggle of the type shown in FIG. 3 can, for example, be controlled to reduce the amount of external light reaching the wearer's eyes in case of a very bright light, such as the detonation of a nuclear device.

Figure 4:
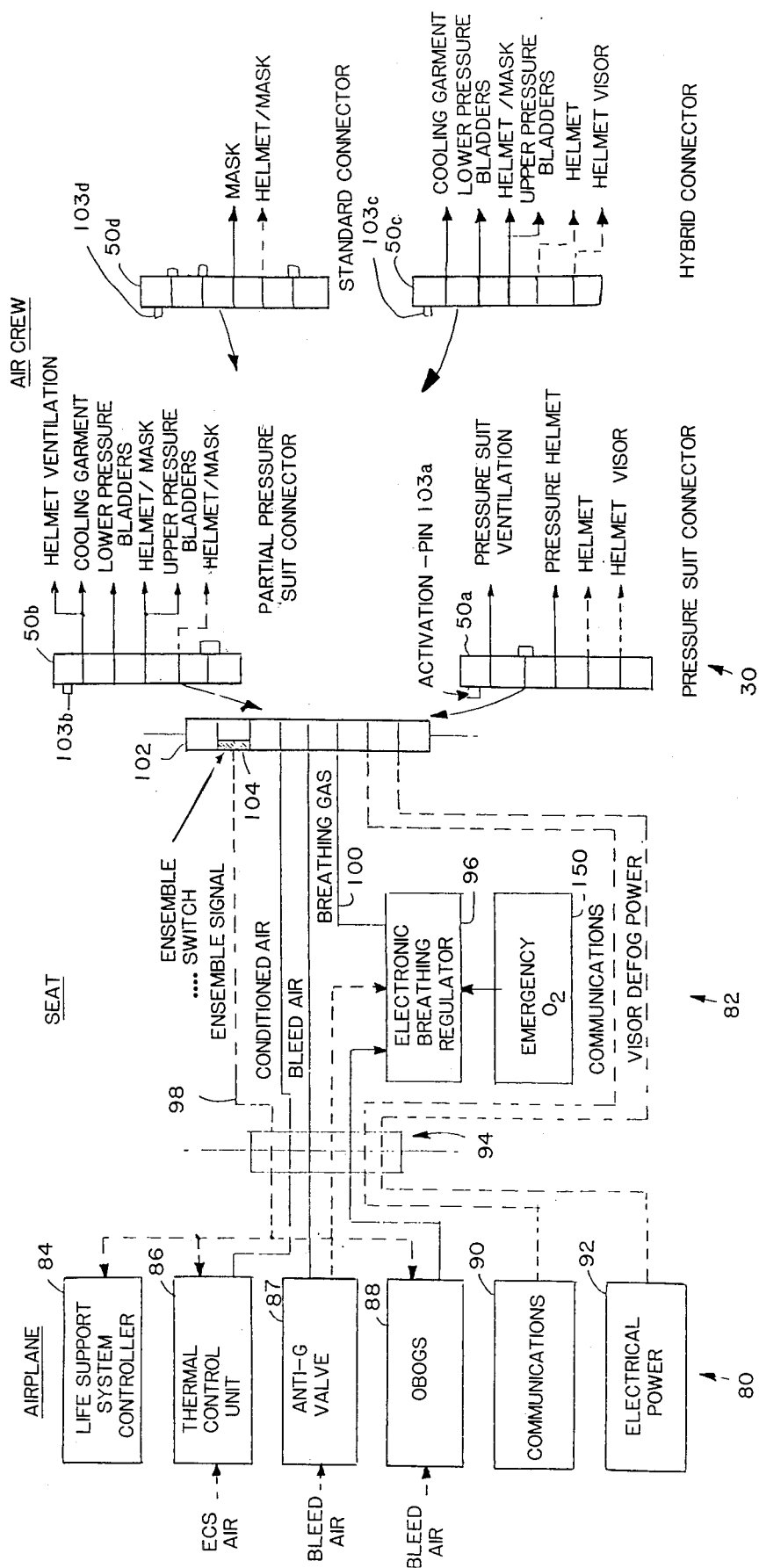
FIG. 4 is a schematic diagram of the system of the present invention.

FIG. 4 is a schematic diagram of the connections among the various components of a life support system. The system is comprised of interconnected equipment in three locations - the airplane 80, the seat 82, and the air crew ensemble 30. Electrical interconnections are indicated by dashed lines, while solid lines represent gas hoses.

The equipment located within the craft can consist of, for example, an electronic life support system controller 84 adapted to produce signals and control other equipment in the airplane, the seat, and the suit. A thermal control unit 86 receives signals from the life support system controller 84 to condition (by heating or cooling) the ventilation gas it receives from the environmental control system (ECS). Referring now to FIG. 2 for illustrative purposes, the air produced by the thermal control unit passes through hose 41 and into the garment at a tee fitting 45, through a hose not shown. A small amount of ventilation gas continues through a small orifice at the tee fitting into the helmet through hose 43. The anti-g valve 87 can receive signals from a life support system controller to cause the anti-g garment to be inflated by bleed air.

In the event that a mission carries the craft to altitudes (above 10 thousand feet) which require an enriched oxygen atmosphere for the occupants, a conventional on-board oxygen generation system (OBOGS) 88 receives bleed air from the aircraft's bleed air system and signals from the life support system controller to create an enchanced oxygen supply.

Also contained within the airplane is a conventional communications system 90 that includes receivers and transmitter to provide external communications.

Lastly, the airplane provides electrical power 92, which can serve to supply the electrical power requirements in the suit.

A connector 94 between the craft and the seat allows signals and the gases to be communicated between the plane and seat. Oxygen-enriched air produced by the OBOGS is received through connector 94 by an electronic breathing regulator 96. The controller also receives an ensemble signal over line 98. In accordance with the signals received over line 98, the electronic breathing regulator supplies a breathing gas on line 100 to seat-side connector 102. The ensemble signal is sent between connector 102 and connector 94, as are conditioned air and bleed air from a thermal control unit and anti-g valve, respectively. In addition, communications signals and electrical power are transmitted directly between connectors 94 and 102.

Connector 102 is adapted to receive any of the connectors 50 that are part of suit 30, whichever aircrew ensemble is worn. Connector 102 supplies all of the gases, communications signals, and electrical power that will be expected by any of the suits that may be worn in the craft. Four possible suit connectors 50a–50d are shown in FIG. 4: full and partial pressure suit connectors, a hybrid suit connector, and a standard connector. Each connector has its respective activation pin 103a–103d, which actuates switch 104 in connector 102, in a manner to be described subsequently, to produce the appropriate ensemble signal on line 98. For example, when a crew member wears a partial pressure suit where high acceleration maneuvers are anticipated, it is necessary that the bleed air provided by the anti-g valve be available to inflate the bladders of the lower g garment. Accordingly, connector 50 for the partial pressure suit is adapted to receive bleed air from connector 102. On the other hand, if the wearer is using a full pressure suit, the PEC does not provide a connection to the bleed air supplied by connector 102.

Similarly, electrical power provided by connector 102 can be adapted for various purposes. For example, when wearing a partial pressure suit, connector 50 is adapted to provide electrical power for nuclear flash blindness goggles 70 (see FIG. 3). When the wearer is in a full pressure suit, connector 50 is adapted to provide appropriate electrical power for visor heating in order to defog the helmet's visor. Connector 50 can also be configured to actuate a switch 104 that has a number of positions and produces the ensemble signal, indication the type of suit that is being worn. Alternatively, the ensemble signal can be generated by a proper configuration of the connector. This signal is sent through connector 94 to the life support system controller, which determines the appropriate gas flow and temperature schedules for use with that suit. The ensemble signal is also received by the life support system controller. Each of these systems is therefore approriately made aware of the ensemble type to which the connector belongs by the switch and tailors its performance accordingly. For example, the electronic regulator will be adjusted to provide breathing gas per the appropriate schedule for the ensemble being worn.

Figure 5:
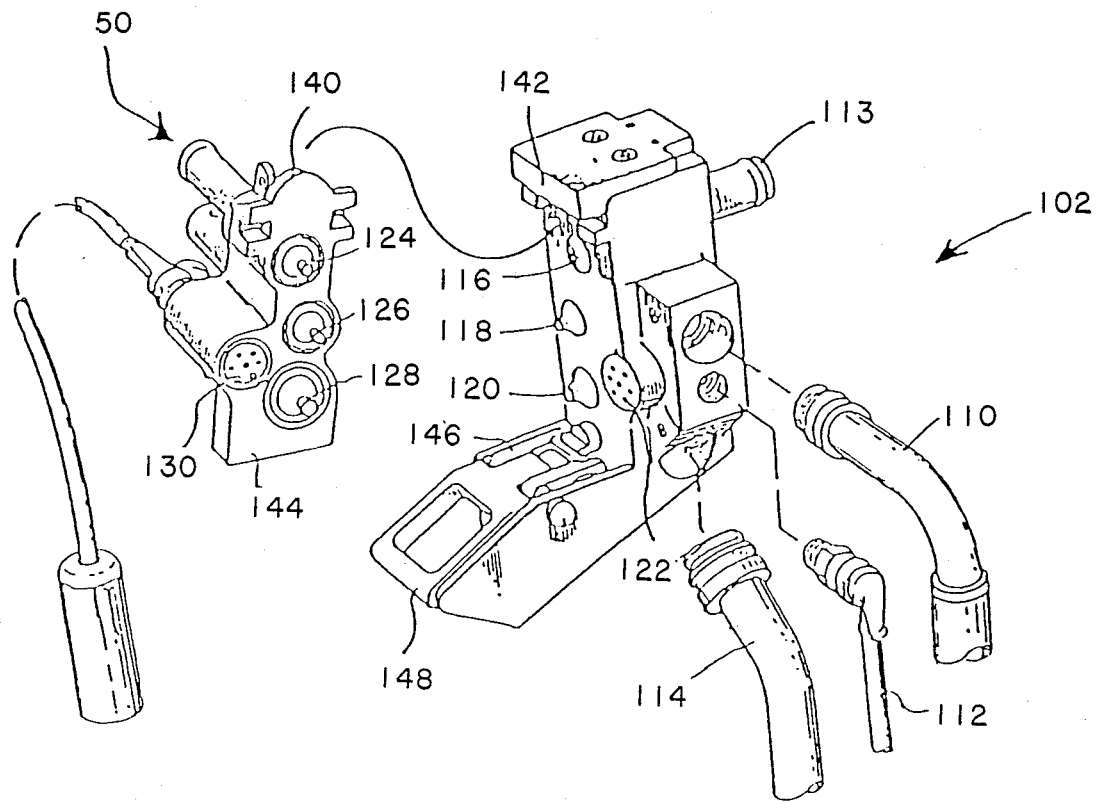
FIG. 5 is a schematic drawing of the connector for use with the present invention.

Referring now to FIG. 5, a close-up view of two mating connectors 50 and 102 is given. The seat-side connector 102 receives oxygen or other appropriate breathing gas through tube 114. The flow schedule and oxygen quality of the gas passing through the tube 114 is determined by the controller in response to the ensemble signal (see FIG. 4). Filtered ventilation air intended for use in the helmet of a partial pressure suit is admitted through fitting 113 (the supply hose connected to fitting 113 is not shown). Line 110 carries bleed air from the anti-g valve for use with the partial pressure suit. The gases provided by hoses 110 and 114 exit from connector 102 at points 116-120, respectively. Connector 102 also contains an electrical plug 122 that carries appropriate electrical signals, such as communications signals and electrical power.

Connector 50, having fittings 124–128, which mate respectively with self-sealing fittings 116–120, attaches to connector 102. Also with this connection, electrical connector 130 is attached to electrical plug 122.

Connection between these two connectors is made by placing upper end 140 of the suit connector under lip 142 of the seat-side connector. The suit connector bottom 144 is then urged toward connector 102, with its lower edge riding on spring-loaded fitting 146. When the lower lip of the bottom portion of the seat connector passes inwardly of the end of spring-loaded fitting 146, the fitting snaps upwardly, capturing the suit connector to the seat connector. The spring-loaded fitting 146 can be overridden downwardly by an upward motion on handle 148. With this operation, the suit and the seat connectors can be disengaged.

In the event of an emergency where the seat must be ejected, fitting 146 is pulled downwardly by a push-/pull-type cable that is part of the emergency escape system (not shown). After the seat is ejected, the wearer is provided with oxygen from the emergency oxygen supply 150 through the electronic breathing regulator (see FIG. 4).

As will be appreciated by those skilled in the art, various modifications of the invention described above can be made without departing from its spirit and scope, which are to be limited only by the following claims.

I claim:

1. A universal life support system for use by an occupant of a craft, said occupant wearing one of a plurality of distinct ensembles, the ensemble the occupant is wearing being dependent upon a mission the craft is intended to perform, said system comprising:
    a first connector attached to said craft, said first connector including switch means for producing one of a plurality of mission signals; and
    a plurality of distinct second connectors that mate with said first connector, each of said distinct second connectors being attached to a distinct one of said plurality of distinct ensembles, each of said second connectors actuating said switch means to produce said one of said mission signals, said one mission signal corresponding to the mission upon which said distinct one of said ensembles depends.

2. The system of claim 1, further comprising a source of breathable gas, said source being connected to said first connector and being responsive to said plurality of mission signals.

3. The system of claim 1, further comprising a thermal control unit connected to said first connector, said thermal control unit being adapted to produce conditioned ventilation gas for controlling the temperature of the occupant, said second connector being adapted to receive and transmit said conditioned ventilation gas from said first connector.

4. The system of claim 1, further comprising a source of electrical power connected to said first connector, said second connector being adapted to transmit said electrical power to said one of said plurality of distinct ensembles from said first connector.

5. The system of claim 1, further comprising a communications system responsive to a communications signal, said communications system being connected to said first connector, said first connector being adapted to receive said communications signal from said second connector.

6. A universal life support system for use by an occupant of an aircraft, said occupant wearing one of a plurality of distinct ensembles, the ensemble being worn being dependent upon a mission the craft is intended to perform, said system comprising:
- a first connector attached to said craft, said first connector including switch means for producing one of a plurality of mission signals;
- thermal control means for producing a conditioned ventilation gas, said thermal control means being connected to said first connector means;
- anti-g valve means for supplying bleed air to said first connector means in response to acceleration conditions imposed on the craft;
- a source of a breathable gas, said source being connected to said first connector means and being responsive to said plurality of mission signals;
- a source of electrical power connected to said first connector means; and
- a plurality of distinct second connectors that mate with said first connector, each of said distinct second connectors being attached to a distinct one of said plurality of distinct ensembles, each of said second connectors actuating said switch means to produce said one of said mission signals, said one signal corresponding to the mission for which said distinct one of said ensembles is intended to perform, each of said second connectors further being adapted to receive said bleed air, said breathable gas, and said electrical power from said first connector and to communicate said conditioned ventilation gas with said first connector.

7. The universal life support system of claim 6 wherein said switch means is mechanically actuable and each of said second connectors is further adapted to mechanically actuate said first connector when said first and second connectors are mated, according to the intent of the mission corresponding to the ensemble to which said second connector is attached.

8. The system of claim 6, further comprising a source of emergency breathable gas and an electronic breathing regulator means, said electronic breathing regulator means being connected to said source of emergency breathable gas and to said first connector, at least one of said second connectors being adapted to adapted to receive said emergency breathable gas from said first connector.

9. The system of claim 8 wherein said plurality of distinct ensembles comprise a full pressure suit, a partial pressure suit, a hybrid suit, and a standard flight suit.

10. A universal life support system for use by an occupant of an aircraft, comprising:
- a first connector attached to said craft, said first connector including switch means for producing a mission signal;
- thermal control means for producing a conditioned ventilation gas, said thermal control means being connected to said first connector means;
- anti-g valve means for supplying bleed air to said first connector means in response to acceleration conditions imposed on the craft;
- a source of a breathable gas, said source being connected to said first connector means and being responsive to said mission signal;
- a source of electrical power connected to said first connector means; and
- an ensemble worn by said aircraft occupant, the ensemble being dependent upon a mission the craft is intended to perform, said ensemble including a second connector that mates with said first connector, said second connector actuating said switch means to produce said mission signal, said mission signal corresponding to the mission which said ensemble is intended to perform, said second connector further being adapted to receive said bleed air, said breathable gas, and said electrical power from said first connector and to communicate said conditioned ventilation gas with said first connector.

11. The system of claim 10 wherein said ensemble is chosen from a plurality of ensembles comprising a full pressure suit, a partial pressure suit, a hybrid suit, and a standard flight suit.

* * * * *